G. BUNTIN.
Designs for End-Frames of Car-Seats.
No. 5,480. Reissued July 8, 1873.
Fig. 1.
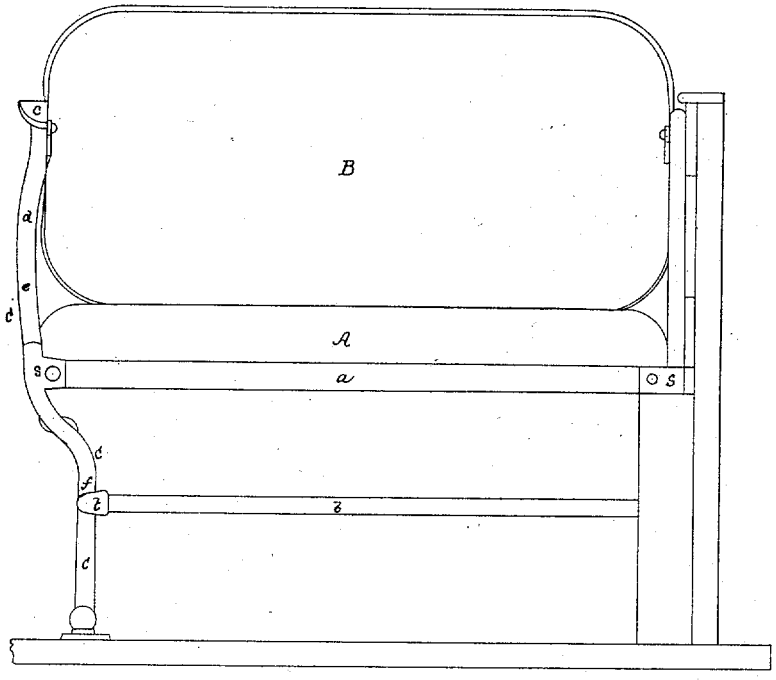
Fig. 2
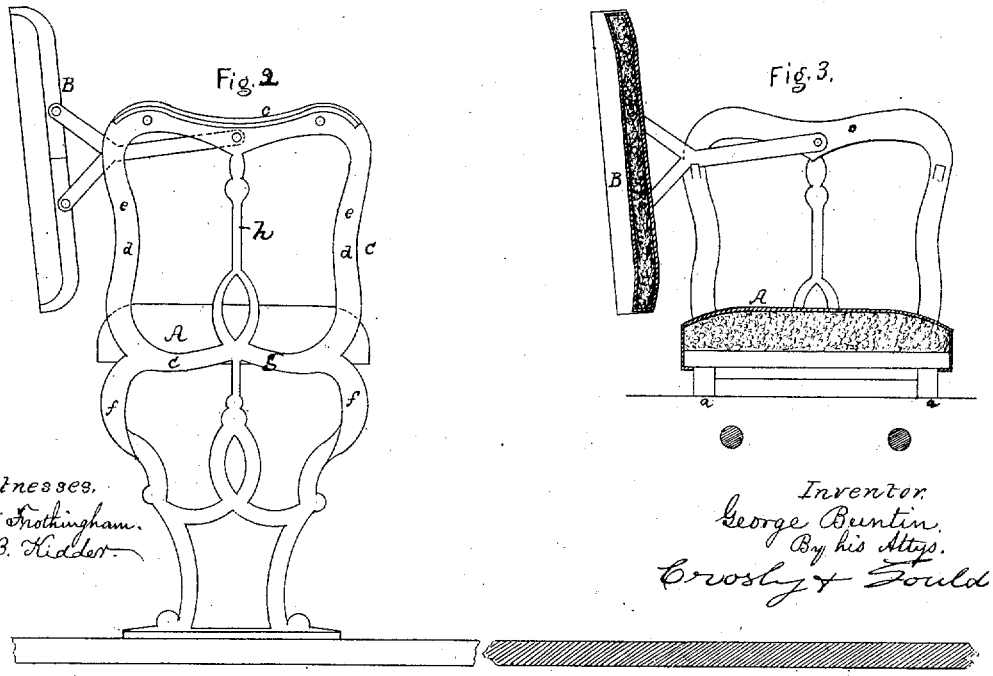
Fig. 3.
Witnesses.
Ms. W. Frothingham.
S. B. Kidder.
Inventor.
George Buntin.
By his Attys.
Crosby & Gould
N. PETERS, Photo-Lithographer, Washington, D. C.

UNITED STATES PATENT OFFICE.

GEORGE BUNTIN, OF BOSTON, MASSACHUSETTS.

DESIGN FOR END FRAMES OF CAR-SEATS.

Specification forming part of Design No. 2,609, dated April 2, 1867; reissue No. 5,480, dated July 8, 1873; application filed April 25, 1873.

*To all whom it may concern:*

Be it known that I, GEORGE BUNTIN, of Boston, in the county of Suffolk and State of Massachusetts, have invented or produced a new Design for a Railway Car-Seat Frame; and I do hereby declare that the following, taken in connection with the drawings which accompany and form part of this specification, is a description of my invention sufficient to enable those skilled in the art to practice it.

The invention relates to a new and original form or shape which I give to the outer end frame of a railway car-seat, to the arm-rest a concave curve at its center, to each vertical bar above the seat a concave curve, and to the vertical bars or legs below the seat curves which bring the two legs centrally toward each other. In the other direction the top of the frame stands inward, thence extends outward, thence inward, and thence still further inward under the seat, the leg part of the frame below the seat being about in a vertical plane, except at the curve that joins it to the part above the seat; the invention consisting in this general compound shape given to the casting to form the outer end frame of a car-seat; or in a frame which, between the upper horizontal bar or arm-rest and the seat-supporting projections or sockets, bows outwardly, and below the seat turns inward, terminating in a vertical leg part that stands under the seat, the frame in the other direction, or in the direction of the length of the car, bowing inwardly at each side between the arm-rest and the seat, and retreating at each side under the seat.

The drawing represents a car-seat embodying the new design.

Figure 1 shows the seat in front elevation. Fig. 2 is an end view of it, showing the end frame in front elevation. Fig. 3 is a vertical section on the line *x x* looking toward the inner arm of the seat.

*a* denotes the seat; C, the end-frame; *o*, the inner arm-rest. Of the end frame, *c* denotes the upper or arm-rest bar; *e e*, the two vertical side bars connecting the bar *c* to the center and seat-supporting bar *g*. From the seat-bar *g* extend the side bars or legs *f f*.

A center-bar, *h*, may connect the bars *c g* and the inner frame may be made to correspond in general form to the upper part of the outer end frame.

I claim—

The design for the outer end frame of a car-seat, the design consisting in a cast-metal frame in which the bars *e e* have the outward curves from the bars *c g* and the inward curves toward each other, and the bars *f* curve inward under the seat and toward each other, substantially as described.

GEORGE BUNTIN.

Witnesses:

FRANCIS GOULD,

M. W. FROTHINGHAM.